United States Patent
Miura et al.

(10) Patent No.: US 10,051,189 B2
(45) Date of Patent: Aug. 14, 2018

(54) ELECTRONIC DEVICE, CONTROL METHOD, AND CONTROL PROGRAM

(71) Applicant: KYOCERA Corporation, Kyoto-shi, Kyoto (JP)

(72) Inventors: Saya Miura, Yokohama (JP); Yosuke Nakanishi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 98 days.

(21) Appl. No.: 15/151,500

(22) Filed: May 11, 2016

(65) Prior Publication Data
US 2016/0337597 A1    Nov. 17, 2016

(30) Foreign Application Priority Data
May 12, 2015 (JP) ................................. 2015-097770

(51) Int. Cl.
*H04N 5/232* (2006.01)
*H04N 5/225* (2006.01)

(52) U.S. Cl.
CPC ....... *H04N 5/23293* (2013.01); *H04N 5/2252* (2013.01); *H04N 5/23216* (2013.01); *H04N 5/23245* (2013.01)

(58) Field of Classification Search
CPC ............ H04N 5/23293; H04N 5/2252; H04N 5/23216; H04N 5/23245
USPC ......................................................... 348/81
See application file for complete search history.

(56) References Cited

U.S. PATENT DOCUMENTS

2009/0201390 A1* 8/2009 Mimura ................. H04N 5/232
                                                        348/222.1
2012/0146924 A1    6/2012 Inoue

FOREIGN PATENT DOCUMENTS

| JP | 2007-86181 A | 4/2007 |
| JP | 2009-194437 A | 8/2009 |
| JP | 2010-166516 A | 7/2010 |
| JP | 2012-123740 A | 6/2012 |

(Continued)

OTHER PUBLICATIONS

JP2007-086181 Machine Translation.*

(Continued)

*Primary Examiner* — Nguyen Truong
(74) *Attorney, Agent, or Firm* — Hauptman Ham, LLP

(57) ABSTRACT

An electronic device according to an aspect includes an imaging device, a sensor, a detector, and at least one controller. The sensor detects information for determining whether the device is in a predetermined state. The detector detects a predetermined operation. The at least one controller performs first control or second control while the imaging device is operating, the first control being for changing function settings relating to various operations of the device into settings corresponding to the predetermined state based on a determination result that the device is in the predetermined state the second control being for changing the function settings into the settings corresponding to the predetermined state in response to reception of the predetermined operation. The at least one controller makes notification corresponding to the first control along with execution of the first control and notification corresponding to the second control along with execution of the second control.

5 Claims, 4 Drawing Sheets

FIG.1

(56) References Cited

FOREIGN PATENT DOCUMENTS

JP          2013-179536 A      9/2013

OTHER PUBLICATIONS

Office Action in JP Application No. 2015-097770, dated Nov. 22, 2016, for which an explanation of relevance is attached.
Office Action in JP Application No. 2015-097770, dated Feb. 7, 2017, for which an explanation of relevance is attached.

* cited by examiner

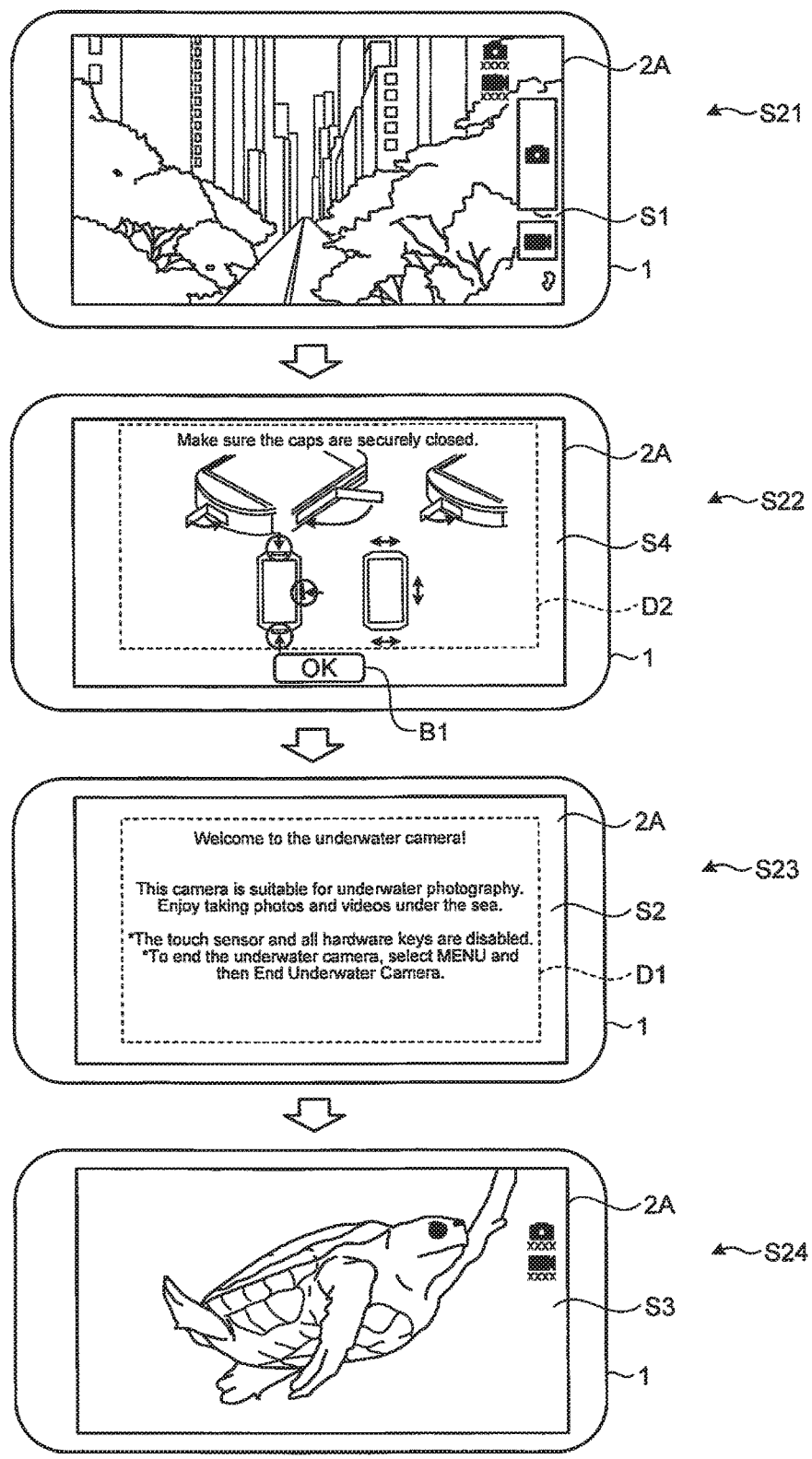

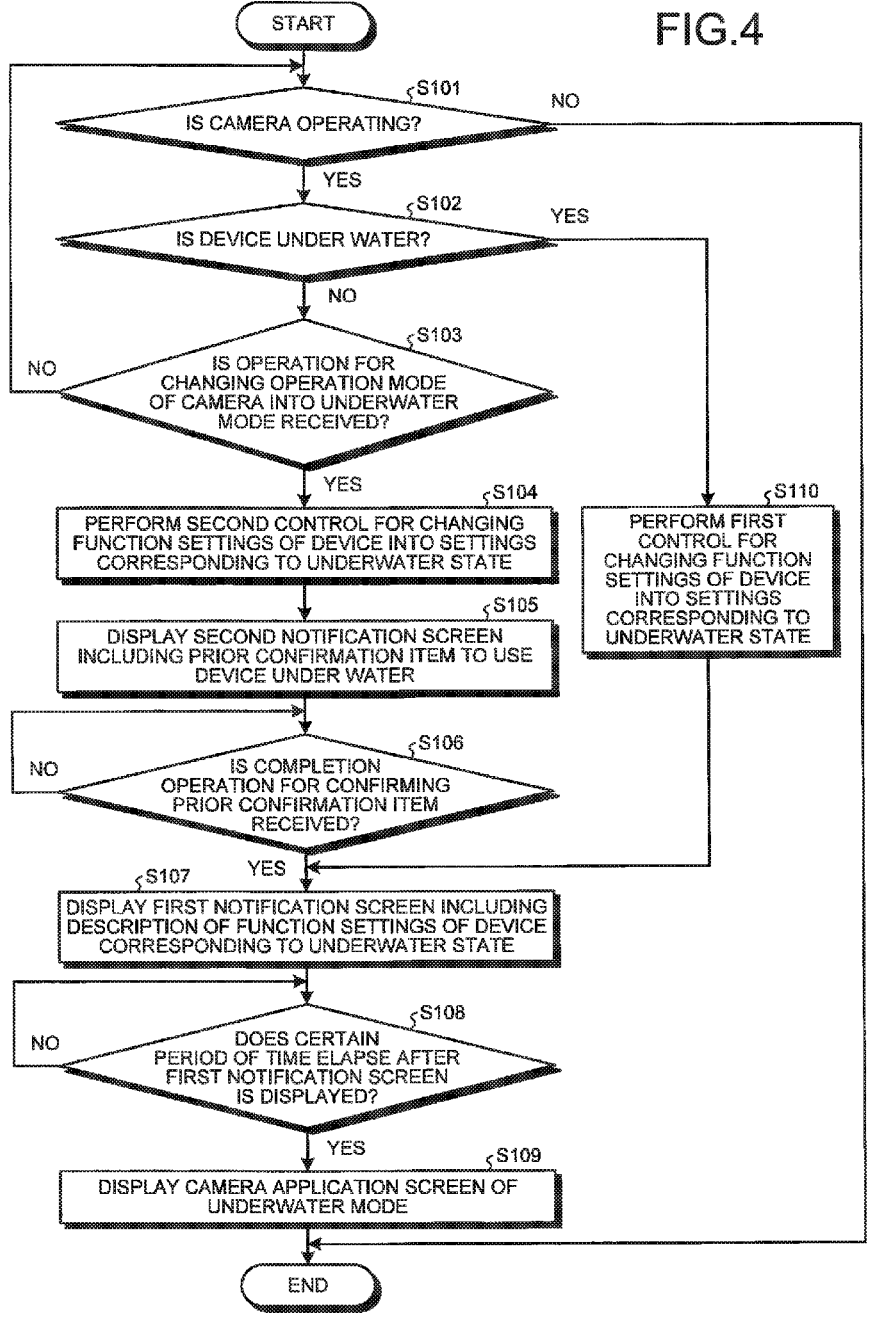

ELECTRONIC DEVICE, CONTROL METHOD, AND CONTROL PROGRAM

CROSS-REFERENCE TO RELATED APPLICATION

The present application claims priority to and incorporates by reference the entire contents of Japanese Patent Application No. 2015-097770 filed in Japan on May 12, 2015.

BACKGROUND

Field

The present application relates to an electronic device, a control method, and a control program.

Description of the Related Art

A known conventional electronic device changes, upon detecting water attached to a display surface, manners of displaying information on the display surface (for example, refer to Japanese Laid-open Patent Publication No. 2012-123740).

The conventional electronic device has room for improvement in the method for changing the display aspect of information displayed on the display surface.

SUMMARY

It is an object of embodiments to at least partially solve the problems in the conventional technology.

According to one aspect, there is provided an electronic device comprising: an imaging device; a sensor configured to detect information for determining whether the electronic device is in a predetermined state; a detector configured to detect a predetermined operation; and at least one controller configured to perform first control or second control, the first control being for changing function settings relating to various operations of the electronic device into settings corresponding to the predetermined state based on a determination result that the electronic device is in the predetermined state while the imaging device is operating, the second control being for changing the function settings into the settings corresponding to the predetermined state in response to reception of the predetermined operation while the imaging device is operating, wherein the at least one controller is configured to make notification corresponding to the first control along with execution of the first control, and the at least one controller is configured to make notification corresponding to the second control along with execution of the second control. According to one aspect, there is provided an electronic device comprising: a sensor configured to detect information for determining whether the electronic device is in a predetermined state; a detector configured to detect a predetermined operation; and at least one controller configured to perform first control or second control, the first control being for changing function settings relating to various operations of the electronic device into settings corresponding to the predetermined state based on a determination result that the electronic device is in the predetermined state while an application is operating, the second control being for changing the function settings into the settings corresponding to the predetermined state in response to reception of the predetermined operation while the application is operating, wherein the at least one controller is configured to make notification corresponding to the first control along with execution of the first control, and the at least one controller is configured to make notification corresponding to the second control along with execution of the second control.

According to one aspect, there is provided a control method performed by an electronic device including an imaging device, the control method comprising: detecting information for determining whether the electronic device is in a predetermined state; receiving a predetermined operation; performing first control for changing function settings relating to various operations of the electronic device into settings corresponding to the predetermined state based on a determination result that the electronic device is in the predetermined state while the imaging device is operating; performing second control for changing the function settings into the settings corresponding to the predetermined state in response to reception of the predetermined operation while the imaging device is operating; making notification corresponding to the first control along with execution of the first control; and making notification corresponding to the second control along with execution of the second control.

According to one aspect, there is provided a non-transitory storage medium that stores a control program for causing, when executed by an electronic device including an imaging device, the electronic device to execute: detecting information for determining whether the electronic device is in a predetermined state; receiving a predetermined operation; performing first control for changing function settings relating to various operations of the electronic device into settings corresponding to the predetermined state based on a determination result that the electronic device is in the predetermined state while the imaging device is operating; performing second control for changing the function settings into the settings corresponding to the predetermined state in response to reception of the predetermined operation while the imaging device is operating; making notification corresponding to the first control along with execution of the first control; and making notification corresponding to the second control along with execution of the second control.

The above and other objects, features, advantages and technical and industrial significance of embodiments will be better understood by reading the following detailed description of presently preferred embodiments, when considered in connection with the accompanying drawings.

BRIEF DESCRIPTION OF THE DRAWINGS

FIG. 3 is a schematic illustrating another example of control performed by the smartphone according to the embodiment; and FIG. 4 is a flowchart of a processing flow performed by the smartphone according to the embodiment.

DETAILED DESCRIPTION OF THE PREFERRED EMBODIMENTS

A plurality of embodiments of an electronic device, a control method, and a control program according to the present application are described in detail with reference to the drawings. The following description uses a smartphone as an example of an electronic device according to the present application.

Embodiments

Figure 1:
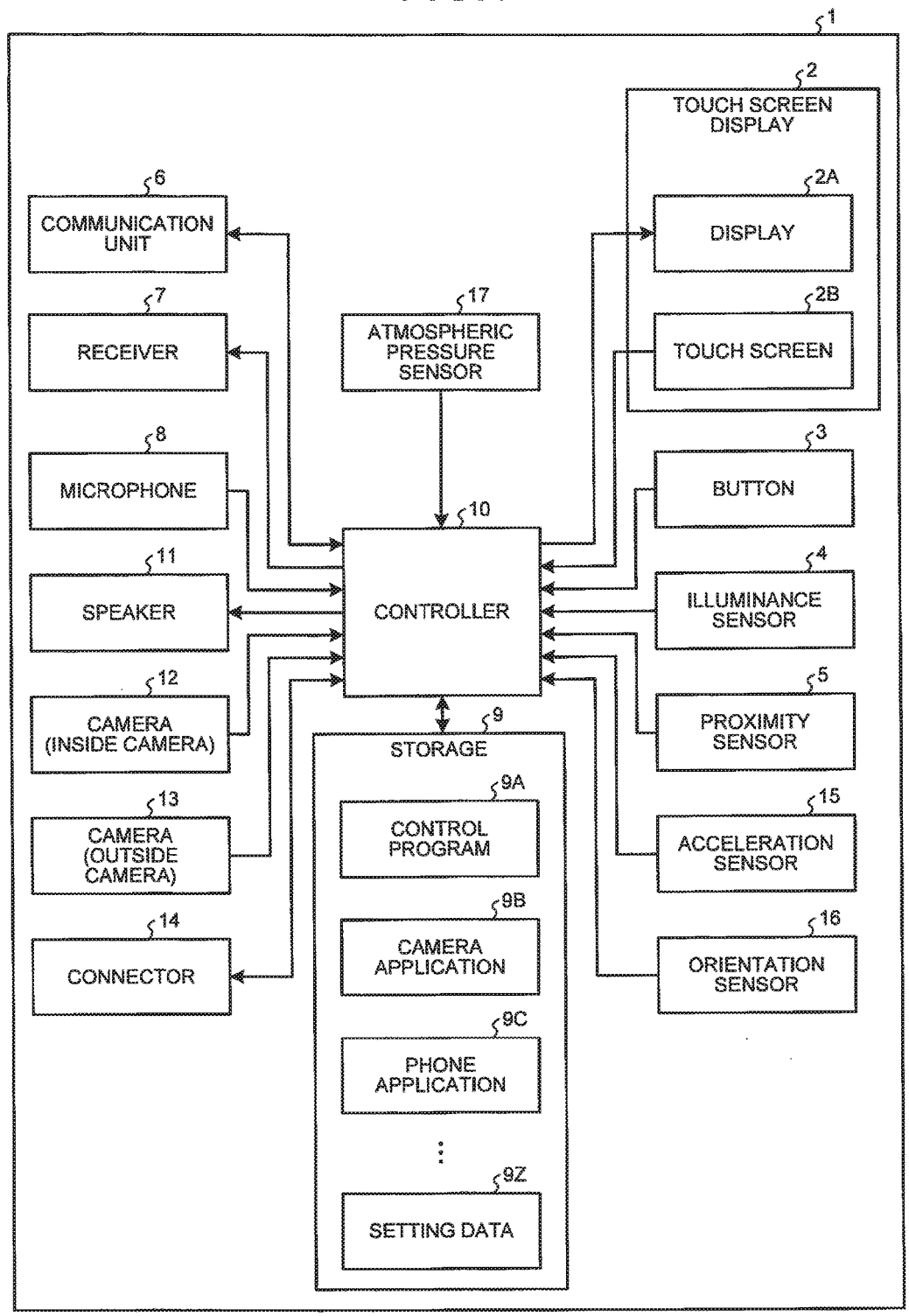
FIG. 1 is a block diagram of a functional configuration of a smartphone according to an embodiment.

An example of a functional configuration of a smartphone 1 according to some embodiments is described with reference to FIG. 1. FIG. 1 is a block diagram illustrating a functional configuration of a smartphone according to some embodiments. In the following description, the same reference signs may be assigned to the same components. Redundant descriptions may be omitted.

As illustrated in FIG. 1, the smartphone 1 includes a touch screen display 2, a button 3, an illuminance sensor 4, a proximity sensor 5, a communication unit 6, a receiver 7, a microphone 8, a storage 9, a controller 10, a speaker 11, a camera 12, another camera 13, a connector 14, an acceleration sensor 15, an orientation sensor 16, and an atmospheric pressure sensor 17. In the following description, a device referred to as "the own device" corresponds to the smartphone 1, and a component simply referred to as "the camera" corresponds to the camera 12 or the camera 13.

The touch screen display 2 includes a display 2A and a touch screen 2B. The display 2A and the touch screen 2B may be, for example, arranged with one on top of the other, arranged side by side, or arranged apart from each other. When the display 2A and the touch screen 2B are arranged with one on top of the other, the touch screen display 2 may have one or more sides of the display 2A, for example, not extending along any side of the touch screen 2B. The touch screen display 2 is an example of a display.

The display 2A is provided with a display device such as a liquid crystal display (LCD), an organic electro-luminescence (EL) display (OELD), or an inorganic electro-luminescence display (IELD). The display 2A can display characters, images, symbols, patterns, or the like. Screens containing characters, images, symbols, patterns, or the like to be displayed by the display 2A include: a screen called a lock screen; a screen called a home screen; and an application screen to be displayed when an application is running. The home screen may be also called a desktop, a standby screen, an idle screen, a default screen, an application list screen, or a launcher screen. The display 2A is an example of the display.

The touch screen 2B detects contact of a finger, a pen, a stylus, or the like with the touch screen 2B. The touch screen 2B can detect a position on the touch screen 2B (hereinafter, referred to as a contact position) at which a plurality of fingers, a pen, a stylus, or the like (hereinafter, simply referred to as a "finger") comes into contact with the touch screen 2B (touch screen display 2). The touch screen 2B notifies the controller 10 of contact of a finger with the touch screen 2B and the contact position. The touch screen 2B is an example of a sensor and a detector. In one embodiment, the touch screen 2B detects information for determining whether the own device is in a predetermined state. In a case where a capacitive method is employed as a detection method, the touch screen 2B detects a change in capacitance, for example, as information for determining whether the own device is under water. In a case where a resistive method or a load detection method is employed as the detection method, the touch screen 2B may detect a change in the magnitude of voltage, for example, as information for determining whether the own device is under water. In a case where a surface acoustic wave method is employed as the detection method, the touch screen 2B may detect attenuation of surface acoustic waves output from the own device, for example, as information for determining whether the own device is under water. In a case where an infrared method is employed as the detection method, the touch screen 2B may detect attenuation of infrared light output from the own device, for example, as information for determining whether the own device is under water.

A detection method employed by the touch screen 2B is not limited to the capacitance method, and may be any desired method such as the resistive film method, the load detection method, the surface acoustic wave method, or the infrared method.

The controller 10 (the smartphone 1) determines a type of a gesture, based on at least one of: a contact detected by the touch screen 2B; a position at which the contact has been detected; a change in position at which the contact has been detected; an interval of detection between contacts; and the number of times that a contact has been detected. The gesture is an operation performed on the touch screen 2B (the touch screen display 2) with a finger. Examples of a gesture that the controller 10 (the smartphone 1) determines via the touch screen 2B include but are not limited to touching, long touching, releasing, swiping, tapping, double-tapping, dragging, flicking, pinching in, and pinching out.

The button 3 receives an operational input from a user. The number of buttons 3 may be one or more than one.

The illuminance sensor 4 detects illuminance levels. An illuminance level is a value of a light flux incident to a unit area of a measurement surface of the illuminance sensor 4. The illuminance sensor 4 is used for, for example, adjustment of the luminance of the display 2A.

The proximity sensor 5 detects the presence of a nearby object without making contact therewith. The proximity sensor 5 detects the presence of an object, based on a change in magnetic field, a change in return time of reflected waves of ultrasound waves, or the like. The proximity sensor 5 detects, for example, approaching of a face to the display 2A. The illuminance sensor 4 and the proximity sensor 5 may be configured as a single sensor. The illuminance sensor 4 may be used as a proximity sensor.

The communication unit 6 wirelessly communicates. Examples of a wireless communication standard supported by the communication unit 6 may include, for example, communication standards for cellular phones such as 2G, 3G, and 4G, and communication standards for short range communication. Examples of a communication standard for cellular phones may include, for example, Long Term Evolution (LTE), Wideband Code Division Multiple Access (W-CDMA), Worldwide Interoperability for Microwave Access (WiMAX (registered trademark)), Code Division Multiple Access (CDMA) 2000, Personal Digital Cellular (PDC), Global System for Mobile Communications (GSM (registered trademark)), and Personal Handy-phone System (PHS). Examples of a communication standard for short range communication include, for example, IEEE802.11, Bluetooth (registered trademark), Infrared Data Association (IrDA), Near Field Communication (NFC), and Wireless Personal Area Network (WPAN). Examples of a WPAN communication standard may include ZigBee (registered trademark). The communication unit 6 may support one or more of the communication standards listed above.

The receiver 7 is a sound output module. The receiver 7 outputs, as sound, sound signals transmitted from the controller 10. The receiver 7 is capable of, for example, outputting the sound of a video and the sound of music reproduced on the smartphone 1 and the voice of a partner on calling. The microphone 8 is a sound input module, and converts the voice of a user and the like into sound signals to be transmitted to the controller 10.

The storage 9 stores therein a computer program and data. The storage 9 is utilized also as a work area that temporarily stores results of processes executed by the controller 10. The storage 9 may include any desirable non-transitory storage medium such as a semiconductor storage medium and a magnetic storage medium. The storage 9 may include a plurality of kinds of storage medium. The storage 9 may include a combination of a storage medium (such as a memory card, an optical disc, or a magneto optical disk) and a storage medium reader. The storage 9 may include a storage device such as a random access memory (RAM) that is utilized as a temporary storage area.

Computer programs stored in the storage 9 include applications to be executed in the foreground or in the background, and a control program (the illustration of which is omitted) that supports the operation of the applications. An application displays screens relating to the application on the display 2A when being executed in the foreground, for example. Examples of the control program include an operating system (OS). A computer program may be installed into the storage 9 via wireless communication using the communication unit 6 or via the non-transitory storage medium.

The storage 9 stores therein, for example, a control program 9A, a camera application 9B, a telephone application 9C, and setting data 9Z.

The control program 9A provides a function to acquire information for determining whether the own device is in the predetermined state and determine whether the own device is in the predetermined state from the touch screen 2B. Specifically, the control program 9A provides a function to detect a specific change caused when the own device is under water based on the capacitance acquired from the touch screen 2B. When the own device is under water, the capacitance measured by the touch screen 2B changes in such a manner that the capacitances at contact points on the touch screen 2B show a distribution of being uniform around a certain value. The control program 9A detects the change, thereby determining whether the own device is under water.

In one embodiment, the control program 9A provides a function to acquire information for determining whether the own device is in the predetermined state from the atmospheric pressure sensor 17 and determine whether the own device is in the predetermined state. Specifically, the control program 9A provides a function to detect a specific change caused when the own device is under water based on a change in the atmospheric pressure value acquired from the atmospheric pressure sensor 17. When the own device is in water, the atmospheric pressure value measured by the atmospheric pressure sensor 17 drastically increases. The control program 9A detects the change, thereby determining whether the own device is under water.

In one embodiment, the control program 9A provides a function to determine whether the own device is in the predetermined state considering both of the determination result based on the detection result of the touch screen 2B and the determination result based on the detection result of the atmospheric pressure sensor 17. The control program 9A according to the embodiment, for example, can employ a process of confirming the determination result that the own device is under water when obtaining the determination result that the own device is under water from at least one of the determination result based on the detection result of the touch screen 2B and the determination result based on the detection result of the atmospheric pressure sensor 17. The control program 9A may employ a process of confirming the determination result that the own device is under water when obtaining the determination result that the own device is under water from both of the determination result based on the detection result of the touch screen 2B and the determination result based on the detection result of the atmospheric pressure sensor 17. Alternatively, the control program 9A may employ a process of determining whether the own device is under water by the determination result based on the detection result of the touch screen 2B preferentially.

The control program 9A provides a function to perform first control for changing function settings relating to various operations of the own device into settings corresponding to the predetermined state based on the determination result that the own device is in the predetermined state while an imaging device is operating. Specifically, the control program 9A provides a function to perform the first control for changing the function settings of the own device into the settings corresponding to an underwater state when the control program 9A determines that the own device is under water while the camera 13 is operating. The control program 9A also provides a function to perform second control for changing the function settings into the settings corresponding to the predetermined state in response to reception of a predetermined operation while the imaging device is operating. Specifically, the control program 9A provides a function to perform the second control for changing the function settings of the own device into the settings corresponding to the underwater state when the control program 9A receives an operation for changing the operation mode of the camera 13 into an underwater mode while the camera 13 is operating. The settings corresponding to the underwater state include disabling an operation on the touch screen 2B and the button 3 and changing the operation mode of the operating camera from a normal mode to the underwater mode, for example. The normal mode is applied to all the use of the camera, such as use of the camera on the ground and on the water, other than underwater use thereof. The contents of the operation mode of the camera include a configuration of a user interface and various settings of processing on an image obtained by the camera.

The control program 9A provides a function to make notification corresponding to the first control along with execution of the first control. Specifically, the control program 9A provides a function to display, on the display, a first notification screen including a description of the function settings relating to various operations of the own device corresponding to the predetermined state along with execution of the first control. When performing the first control, for example, the control program 9A displays, on the display 2A, the first notification screen including the description of the function settings corresponding to the underwater state.

The control program 9A provides a function to make notification corresponding to the second control along with execution of the second control. Specifically, the control program 9A provides a function to display, on the display, a second notification screen including an item to be confirmed in advance to use the own device in the predetermined state along with execution of the second control before displaying the first notification screen. When performing the second control, for example, the control program 9A displays, on the display 2A, the second notification screen including a prior confirmation item to use the own device under water before displaying the first notification screen. The control program 9A also provides a function to delete display of the second notification screen from the display 2A and then display the first notification screen on the display 2A on the condition that the control program 9A receives a completion operation for confirming the second notification screen from the user after displaying the second notification screen. The first notification screen displayed along with execution of the first control may be the same as or different from the first notification screen displayed after the second notification screen is displayed, when the first notification screen include a description of the function settings corresponding to the underwater state. In one embodiment, the smartphone 1 can be set not to display the first notification screen. By setting not to display the first notification screen, the user can take a photo or record a video immediately after the smartphone 1 performs the first control or display the second notification screen. In one embodiment, the smartphone 1 cannot be set not to display the second notification screen. When the smartphone 1 cannot be set not to display the second notification screen, the smartphone 1 can urge the user to carry out confirmation to use the own device under water.

The camera application 9B provides a function to perform image capturing, edition, and management of an image and video. The camera application 9B according to the embodiment has a function to provide a camera application screen to use the camera 13 (or the camera 12) in the normal mode and a camera application screen to use the camera 13 (or the camera 12) in the underwater mode.

The telephone application 9C provides a telephone call function for telephone calls in wireless communication.

The setting data 9Z includes various data that are used in processes to be executed based on the functions provided by the control program 9A and the like and in processes to be executed based on the functions provided by the camera application 9B. The setting data 9Z includes data to be used for determining whether the own device is under water. The data to be used for determining whether the own device is under water includes reference data regarding the distribution of variations in capacitance in water, and reference data regarding changes in atmospheric pressure in water. The setting data 9Z includes data to be used for implementing individual functions of the camera application 9B.

The controller 10 includes an arithmetic processor. Examples of the arithmetic processor include but are not limited to a central processing unit (CPU), a system-on-a-chip (SoC), a micro control unit (MCU), a field-programmable gate array (FPGA), and a coprocessor. The controller 10 integrally controls operation of the smartphone 1, thereby implementing various functions. The controller 10 is an example of a control module.

Specifically, the controller 10 executes commands contained in a computer program stored in the storage 9 while referring as necessary to data stored in the storage 9. The controller 10 controls the functional modules in accordance with the data and the commands, thereby implementing the various functions. The examples of the functional module include but are not limited to the display 2A, the communication unit 6, the microphone 8, and the speaker 11. The controller 10 may change the control in accordance with a detection result from a detection module. The examples of the detection module include but are not limited to the touch screen 2B, the button 3, the illuminance sensor 4, the proximity sensor 5, the microphone 8, the camera 12, the camera 13, the acceleration sensor 15, the orientation sensor 16, and the atmospheric pressure sensor 17.

Figure 2:
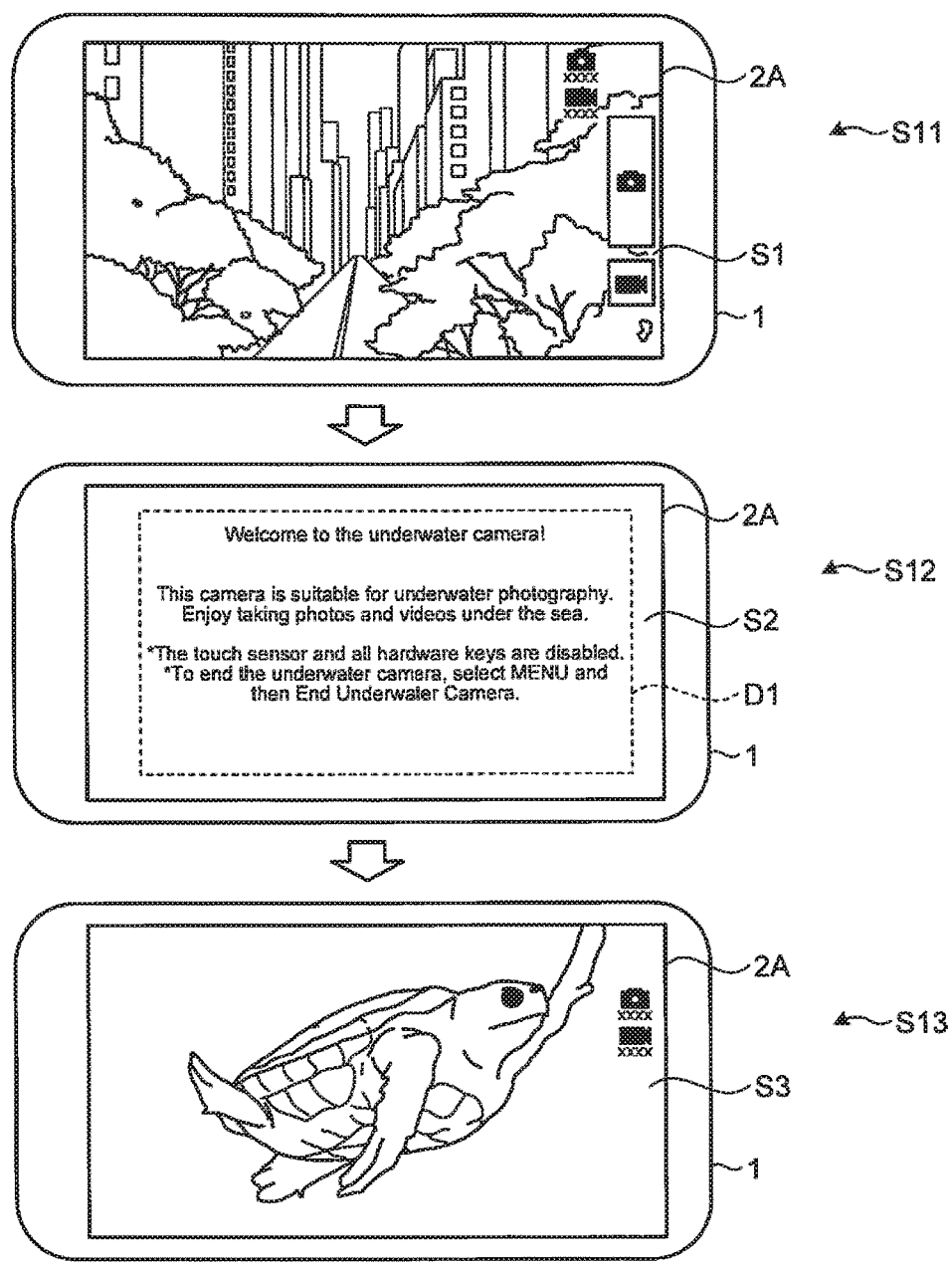
FIG. 2 is a schematic illustrating an example of control performed by the smartphone according to the embodiment.

The controller 10 executes the control program 9A, thereby performing processing for making notification corresponding to the first control along with execution of the first control. The controller 10 executes the control program 9A, thereby performing processing for making notification corresponding to the second control along with execution of the second control. The following describes examples of control performed by the smartphone 1 according to the embodiment with reference to FIGS. 2 and 3. FIGS. 2 and 3 are schematics illustrating examples of control performed by the smartphone according to the embodiment. In the following description, a component simply referred to as "the camera" corresponds to the camera 12 and the camera 13. A component referred to as "the device" corresponds to the smartphone 1.

The following describes control performed by the smartphone 1 to make notification corresponding to the first control with reference to FIG. 2. When detecting an operation of the camera on the ground, for example, the smartphone 1 activates the camera application 9B and displays a camera application screen S1 of the normal mode on the display 2A as illustrated as Step S11.

Subsequently, if the smartphone 1 determines that the own device is under water while the camera is operating (hereinafter, simply referred to as during camera operation), the smartphone 1 performs the first control for changing the function settings of the own device into the settings corresponding to the underwater state and makes notification corresponding to the first control. As illustrated as Step S12, for example, the smartphone 1 displays, on the display 2A, a first notification screen S2 including a description D1 of the function settings corresponding to the underwater state as the notification corresponding to the first control. In other words, if the smartphone 1 determines that the own device is under water during camera operation, the smartphone 1 notifies the user of functional limitations and other information to operate the smartphone 1 under water on the assumption that the user is using the smartphone 1 under water.

Subsequently, if a certain period of time elapses after the first notification screen S2 is displayed, the smartphone 1 displays a camera application screen S3 of the underwater mode on the display 2A as illustrated as Step S13.

The following describes control performed by the smartphone 1 to make notification corresponding to the second control with reference to FIG. 3. When detecting an operation of the camera on the ground, for example, the smartphone 1 activates the camera application 9B and displays the camera application screen S1 of the normal mode on the display 2A as illustrated as Step S21.

Subsequently, if the smartphone 1 receives an operation for changing the operation mode of the camera into the underwater mode during camera operation, the smartphone 1 performs the second control for changing the function settings of the own device into the settings corresponding to the underwater state and makes notification corresponding to the second control. In other words, if the smartphone 1 receives an operation for changing the operation mode of the camera into the underwater mode while the camera application 9B is operating, the smartphone 1 performs the second control for changing the function settings of the own device into the settings corresponding to the underwater state and makes notification corresponding to the second control. As illustrated in Step S22, for example, the smartphone 1 displays, on the display 2A, a second notification screen S4 including an item D2 to be confirmed in advance to use the own device underwater as the notification corresponding to the second control before displaying the first notification screen S2. In other words, if the user performs a manual operation for changing the operation mode of the camera into the underwater mode during camera operation, the smartphone 1 notifies the user of a confirmation item to urge the user to make the smartphone 1 waterproof before bringing it into contact with water. In other words, if the operation is manually performed, the smartphone 1 is assumed to be in a state just before being used under water. The smartphone 1 notifies the user of a confirmation item to urge the user to make it waterproof. The confirmation item to urge the user to make the smartphone 1 waterproof includes a process for causing the user to check whether various types of caps of the smartphone 1 are securely closed, for example.

Subsequently, if the smartphone 1 detects an operation performed on a detector B1 on the second notification screen S4, the smartphone 1 deletes display of the second notification screen S4 from the display 2A and then displays the first notification screen S2 on the display 2A as illustrated in Step S23. The operation performed on the a detector B1 is an example of a completion operation for confirming the prior confirmation item D2.

Subsequently, if a certain period of time elapses after the first notification screen S2 is displayed, the smartphone 1 displays the camera application screen S3 of the underwater mode on the display 2A as illustrated in Step S24.

The speaker 11 is a sound output module. The speaker 11 outputs, as sound, sound signals transmitted from the controller 10. The speaker 11 is used for outputting, for example, a ringtone and music. One of the receiver 7 and the speaker 11 may functionally double as the other.

The camera 12 and the camera 13 convert captured images into electric signals. The camera 12 is an inside-camera that captures an image of an object that faces the display 2A. The camera 13 is an outside-camera that captures an image of an object that faces the opposite surface of the display 2A. The camera 12 and the camera 13 may be mounted on the smartphone 1 in a functionally and physically integrated state as a camera unit in which the inside camera and the outside camera can be switched from one to the other.

The connector 14 is a terminal to which another apparatus is connected. The connector 14 may be a universal terminal such as a universal serial bus (USB), a high-definition multimedia interface (HDMI (registered trademark)), Light Peak (Thunderbolt (registered trademark)), or an earphone/microphone connector. The connector 14 may be a specialized connector such as a Dock connector. Examples of an apparatus to be connected to the connector 14 include but are not limited to an external storage, a speaker, and a communication apparatus.

The acceleration sensor 15 detects a direction and a magnitude of acceleration acting on the smartphone 1. The orientation sensor 16 detects the direction of the terrestrial magnetism, for example, to detect the direction (orientation) of the smartphone 1 based on the direction of the terrestrial magnetism. The atmospheric pressure sensor 17 detects atmospheric pressure acting on the smartphone 1.

The smartphone 1 may include a GPS receiver and a vibrator in addition to the above individual functional modules. The GPS receiver receives radio signals in a certain frequency band from GPS satellites, demodulates the radio signals thus received, and transmits the demodulated signals to the controller 10, thereby supporting arithmetic processing to find the current location of the smartphone 1. The vibrator vibrates a part or the entirety of the smartphone 1. The vibrator includes, for example, a piezoelectric element or an eccentric motor so as to generate vibration. Although not illustrated in FIG. 1, a functional module such as a battery that is inevitably used to maintain the functions of the smartphone 1, and a control module that is inevitably used to implement control of the smartphone 1 are mounted on the smartphone 1.

The following describes an example of a processing flow performed by the smartphone 1 according to the embodiment with reference to FIG. 4. FIG. 4 is a flowchart of the processing flow performed by the smartphone according to the embodiment. The processing illustrated in FIG. 4 is performed by the controller 10 executing the control program 9A and the camera application 9B stored in the storage 9. In the following description, a component simply referred to as "the camera" corresponds to the camera 12 and the camera 13. A component referred to as "the own device" corresponds to the smartphone 1.

As illustrated in FIG. 4, at Step S101, the controller 10 determines whether the camera is operating.

When it is determined that the camera is operating (Yes at Step S101), then at Step S102, the controller 10 determines whether the own device is under water.

When it is determined that the own device is not under water (No at Step S102), then at Step S103, the controller 10 determines whether an operation for changing the operation mode of the camera into the underwater mode is received.

When it is determined that an operation for changing the operation mode of the camera into the underwater mode is not received (No at Step S103), the controller 10 is returned to Step S101.

By contrast, when it is determined that an operation for changing the operation mode of the camera into the underwater mode is received (Yes at Step S103), then at Step S104, the controller 10 performs the second control for changing the function settings of the own device into the settings corresponding to the underwater state.

Subsequently, at Step S105, the controller 10 displays, on the display 2A, the second notification screen including a prior confirmation item to use the own device under water.

Subsequently, at Step S106, the controller 10 determines whether a completion operation for confirming the prior confirmation item is received.

When it is determined that a completion operation for confirming the prior confirmation item is not received (No at Step S106), the controller 10 performs the determination at Step S106 again.

By contrast, when it is determined that a completion operation for confirming the prior confirmation item is received (Yes at Step S106), then at Step S107, the controller 10 displays, on the display 2A, the first notification screen including the description of the function settings of the own device corresponding to the underwater state.

Subsequently, at Step S108, the controller 10 determines whether a certain period of time elapses after the first notification screen is displayed.

When it is determined that a certain period of time does not elapse after the first notification screen is displayed (No at Step S108), the controller 10 performs the determination at Step S108 again.

By contrast, when it is determined that a certain period of time elapses after the first notification screen is displayed (Yes at Step S108), the controller 10 displays the camera application screen of the underwater mode (Step S109) and finishes the processing illustrated in FIG. 4.

When it is determined that the own device is under water at Step S102 (Yes at Step S102), then at Step S110, the controller 10 performs the first control for changing the function settings of the own device into the settings corresponding to the underwater state and proceeds to Step S107.

When it is determined that the camera is not operating at Step S101 (No at Step S101), the controller 10 finishes the processing illustrated in FIG. 4.

When the smartphone 1 according to the embodiments determines that the own device is under water during camera operation, the smartphone 1 notifies the user of functional limitations and other information to operate the smartphone 1 under water on the assumption that the user is using the smartphone 1 under water. By contrast, when the user performs a manual operation for changing the operation mode of the camera into the underwater mode during camera operation, the smartphone 1 notifies the user of a confirmation item to urge the user to make the smartphone 1 waterproof before bringing it into contact with water. In other words, when the operation is manually performed, the smartphone 1 is assumed to be in a state just before being used under water. The smartphone 1 notifies the user of a confirmation item to urge the user to make it waterproof. With this configuration, the embodiments enable highly convenient notification control.

The description has been made of an example where the smartphone 1 according to the embodiments displays, on the display 2A, the second notification screen including a prior confirmation item to use the own device under water. However, the embodiments are not limited thereto. The smartphone 1 may notify the user of the prior confirmation item to use the own device under water with sound, such as sound guidance.

The processes described as embodiments are also applicable to other electronic devices expected to have operations performed thereon in water as well as to the smartphone 1.

In order to completely and clearly disclose the techniques according to the appended claims, characteristic embodiments have been described. However, embodiments are not intended to limit the appended claims. The appended claims are embodied by all modifications and alternative configurations that can be invented by those skilled in the art within the scope of the basic teaching set forth herein.

Although the embodiments have been described for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device, comprising:
   a display;
   a sensor;
   a detector configured to detect a predetermined operation; and
   at least one controller configured to cause the sensor to detect information, determine whether the electronic device is in a predetermined state based on the information detected by the sensor, and perform first control or second control, the first control being for changing function settings relating to various operations of the electronic device into settings corresponding to the predetermined state based on a determination result that the electronic device is in the predetermined state while an application is operating, the second control being for changing the function settings into the settings corresponding to the predetermined state in response to reception of the predetermined operation while the application is operating, wherein
   the at least one controller is configured to make notification corresponding to the first control along with execution of the first control,
   the at least one controller is configured to make notification corresponding to the second control along with execution of the second control,
   the at least one controller is configured to display, on the display, a first notification screen including a description of the function settings corresponding to the predetermined state along with execution of the first control,
   the at least one controller is configured to display, on the display, a second notification screen including a prior confirmation item to use the electronic device in the predetermined state along with execution of the second control, and
   the at least one controller is configured to display, on the display, the second notification screen along with execution of the second control before displaying the first notification screen.

2. The electronic device according to claim 1, further comprising an imaging device, wherein the application has a function using the imaging device.

3. A control method performed by an electronic device including an imaging device and a touch screen display, the control method comprising:
   detecting information for determining whether the electronic device is in a predetermined state;
   receiving a predetermined operation via the touch screen display;
   performing first control for changing function settings relating to various operations of the electronic device into settings corresponding to the predetermined state based on a determination result that the electronic device is in the predetermined state while the imaging device is operating;
   performing second control for changing the function settings into the settings corresponding to the predetermined state in response to reception of the predetermined operation while the imaging device is operating;
   making notification corresponding to the first control along with execution of the first control; and
   making notification corresponding to the second control along with execution of the second control,
   wherein the control method further comprises:
   displaying, on the touch screen display, a notification screen including a prior confirmation item to use the electronic device in the predetermined state along with execution of the second control;
   restricting, when performing the first control, an operation on the touch screen display along with execution of the first control; and
   restricting, when performing the second control, an operation on the touch screen display after said displaying the notification screen.

4. A non-transitory storage medium that stores a control program for causing, when executed by an electronic device including an imaging device, a sensor and a display, the electronic device to execute a control method comprising:
   detecting, by the sensor, information for determining whether the electronic device is in a predetermined state;
   receiving a predetermined operation;
   performing first control for changing function settings relating to various operations of the electronic device into settings corresponding to the predetermined state based on a determination result that the electronic device is in the predetermined state while the imaging device is operating;
   performing second control for changing the function settings into the settings corresponding to the predetermined state in response to reception of the predetermined operation while the imaging device is operating;

making notification corresponding to the first control along with execution of the first control; and making notification corresponding to the second control along with execution of the second control, wherein the control method further comprises:

determining whether the electronic device is under water based on the information detected by the sensor and changing, when it is determined that the electronic device is under water, the function settings into settings corresponding to an underwater state;

displaying, when performing the first control, a first notification screen including a description of the function settings corresponding to the underwater state on the display; and displaying, when performing the second control, a second notification screen including a prior confirmation item to use the electronic device underwater on the display.

5. The non-transitory storage medium according to claim 4, wherein the control method further comprises:

deleting display of the second notification screen from the display and displaying the first notification screen on the display upon receipt of a completion operation for confirming the second notification screen from a user after displaying the second notification screen.

\* \* \* \* \*